United States Patent Office 3,851,009
Patented Nov. 26, 1974

3,851,009
OXIDATIVE DEHYDROGENATION PROCESSES
Robert S. Cichowski, San Luis Obispo, Calif., assignor to
Phillips Petroleum Company
No Drawing. Original application May 6, 1971, Ser. No.
140,969, now Patent No. 3,784,483. Divided and this
appplication July 20, 1973, Ser. No. 381,018
Int. Cl. C07c 5/18
U.S. Cl. 260—680 E
5 Claims

ABSTRACT OF THE DISCLOSURE

Organic compounds are dehydrogenated to compounds having a higher degree of unsaturation by contacting the feedstock in the vapor phase in the presence of an oxygen-containing gas with a catalyst comprising cobalt in association with iron, phosphorus and oxygen. Representative of such conversions is the oxidative dehydrogenation of isopentane to isoprene and isoamylenes. The conversion products are valuable compounds particularly useful as intermediates for the preparation of polymeric materials such as synthetic rubbers and the like.

---

This is a division of my copending application Ser. No. 140,969 filed May 6, 1971, Pat. No. 3,784,483.

The present invention relates to chemical compositions and chemical processes. More particularly, the invention relates to catalyst compositions, their preparation, and to catalytic processes employing such compositions, e.g., processes for effecting the dehydrogenation of hydrocarbons.

Dehydrogenation process for the conversion of organic compounds to compounds having a higher degree of unsaturation include both thermal noncatalytic and catalytic processes. The former are characterized by undesirable side reactions, low order of conversion and yields and poor product selectivity. The catalytic processes are generally characterized by the particular catalytic material employed and the conditions under which the processes are operated, e.g., in the absence or presence of oxygen. While a number of such catalytic processes have attained some measure of commercial success, there is a continuing search to discover and develop catalytic materials for such processes. Desirable catalysts are those materials which are more efficient in minimizing side reactions, in improving conversion rates, in improving yields and selectivities to desired end product, and which have a low susceptibility to deactivation, i.e., are capable of extended periods of operation without regeneration, and which can be readily regenerated to an activity approaching that of fresh catalyst. The problem constantly faced by those skilled in the art is the selection and characterization of the compositions which are highly efficient dehydrogenation catalysts.

A great deal of recent work has been done with catalysts and catalyst systems which include halogens or halogen-releasing compounds. Such processes, however, have exhibited so many disadvantages in regard to equipment corrosion and the additional expense of continuously feeding, recovering and recycling the relatively expensive halogen materials that their use is economically practical, large scale operations has been effectively precluded. Halogen-free catalysts presently appear to be the most desirable for use in dehydrogenation processes.

The present invention provides a novel catalyst and a novel process for the conversion of organic feedstocks to products having a greater degree of unsaturation and which have the same or lower number of carbon atoms as in the organic feed. According to this invention, organic feedstocks can be converted directly to products having a greater degree of unsaturation by contacting said feedstock under dehydrogenation conditions in the vapor phase in the presence of molecular oxygen with a catalytic material comprising cobalt in association with iron, phosphorus and combined oxygen. For example, paraffinic hydrocarbons can be converted in good yields to diolefins and/or monoolefins and monoolefins can be converted to diolefins. The invention is particularly suitable for the production of diolefins from paraffins and particularly useful results are obtained by the dehydrogenation of isopentane to isoprene and isoamylenes. The conversion products are valuable compounds useful, for example, as intermediates for the preparation of polymeric materials such as synthetic rubbers and the like.

The feedstocks which are applicable for the oxidative dehydrogenation processes of the present invention comprise dehydrogenatable organic compounds having from about 2 to 12 carbon atoms per molecule and at least one

grouping. Hydrocarbons are particularly applicable. These can be branched or unbranched and include paraffins as well as monoolefins, but paraffins are presently preferred. The conversion of isopentane to isoprene and to isoamylenes has been found particularly advantageous by the processes of the invention. Some specific examples of other feeds include ethane, propane, butane, isobutane, pentane, hexane, 2-methylhexane, octane, 2,4-dimethyloctane, butene-2, 2-methylbutene-1, hexene-2, octene-1, 3-methylnonene-4, dodecene-1, and the like, including mixtures thereof.

The novel catalysts of the present invention comprise cobalt associated with iron and phosphorus, together with sufficient oxygen to satisfy the valence requirements of these elements. These elements are not in the elemental state but can be combined with sufficient oxygen to form one or more neutral compounds such as cobalt phosphate, iron phosphate, cobalt oxide, iron oxide, phosphorus oxide, etc., depending upon the proportions of each element present. In general, the phosphorus should be present in an amount such that the phosphorus:cobalt atomic ratio is in the range of about 0.01–0.5:1, and preferably will be in the range of about 0.1–0.3:1. The iron will be present in minor amounts in a range such that the iron:cobalt atomic ratio is in the range of about 0.01–0.3:1, and preferably will be between about 0.05–0.2:1.

These catalysts can also be supported on or diluted with conventional catalytic carrier materials such as silica, alumina, boria, magnesia, titania, zirconia, and combinations thereof, as well as other similar conventional materials known in the art. When used, such carrier materials will generally constitute from 40 to 90 weight percent, preferably 60 to 90 weight percent, of the finished composite catalyst.

The catalysts of the present invention can be prepared by any suitable method. Conventional methods such as coprecipitation, impregnation, or dry mixing can be used. In general, any method can be used which will provide a composition containing the above-described elements in the above-described proportions and which will have a catalytic surface area of at least about 1 square meter per gram. Thus, a cobalt compound, a phosphorus compound and an iron compound can be combined in any suitable way. Substantially any cobalt, phosphorus, or iron compounds can be employed in the preparation of these catalysts so long as none of the compounds are detrimental to the final oxidative dehydrogenation catalyst, and essentially all of the elements in the compounds used, other than the cobalt, phosphorus and iron are removed from the final catalyst by prior washing or by volatilization. However, small amounts of some other elements involved in the preparation of the catalyst can be tolerated in the final catalytic composition. For example, if alkali metal or alkaline earth metal hydroxides are used in the procedure involving precipitation of the cobalt and iron, small residual amounts of such metals are not damaging. Similarly, if iron sulfate or cobalt sulfate are employed in the preparation, small residual amounts of sulfur can be tolerated. Halogen residues, on the other hand, are undesirable and these should be minimized.

Generally, however, the preferred cobalt, phosphorus and iron compounds are either the oxides of these elements or compounds convertible to the oxide on calcination. Some examples of these are cobalt nitrate, cobalt acetate, ferric nitrate, phosphoric acid, and the like.

A preferred catalyst preparation method is to boil a solution containing soluble compounds of cobalt, phosphorus and iron until sufficient water has been removed and the mixture is a viscous, hot, syrupy liquid which solidifies on cooling. This largely dehydrated mixture is then relatively rapidly brought to a high temperature in a furnace. For example, the mixture is heated to 1000–1500° F. over a period not exceeding four hours, preferably not exceeding two hours. This relatively rapid heating to calcination temperature generally causes a foaming and expansion of the mixture and then a solidification to a very porous and very uniform mass having a low apparent density. After reaching this calcination temperature, the mass is further heated in air at 1000°–1400° F., for 1–24 hours.

After this calcination, the catalyst is active for use in oxidative dehydrogenation processes and can be converted into any desired form or shape, such as powder, granules, pellets, and the like.

In an alternative catalyst preparation method, solutions of suitable cobalt and iron compounds are coprecipitated by the addition of alkali metal or alkaline earth metal hydroxides. The precipitate is then filtered, washed, dried, then impregnated with a solution of a suitable phosphorus compound such as phosphoric acid. This composite is then activated by calcination in an oxygen-containing gas such as air at a temperature of 900–1500° F. for 1–24 hours, or until the catalyst is active for oxidative dehydrogenation.

The hydrocarbon feedstocks can be dehydrogenated according to the process and with the catalysts of the present invention at temperatures in the range from about 800 to about 1300° F., preferably from about 950 to about 1200° F., at any convenient pressure such as from about 7 to about 250 p.s.i.a. and at a hydrocarbon:oxygen ratio of from about 1:1 to about 1:4. The presence of steam is frequently beneficial and a steam:hydrocarbon ratio up to about 50:1 can be used. The hydrocarbon feed rate will generally be in the range of from about 50 to about 5,000 GHSV. The fixed catalyst bed is the preferred mode of contact, but other modes, such as the fluidized bed, can also be used.

The dehydrogenation processes of this invention are ordinarily carried out by forming a mixture, preferably a preheated mixture, of the hydrocarbon feed, the oxygen-containing gas and the steam (if used), and passing this mixture over the catalyst at the desired temperature. The effluent from the reaction zone is subjected to any suitable separation method to isolate and recover the desired products. Unconverted feeds or partially converted materials can be recycled.

Generally, at least trace amounts of oxygenated products are also formed in these reactions. For example, compounds such as furan, acetaldehyde, furfural, and acetic acid can be obtained, depending upon the feed. Some carbon oxides will be formed as well as some cracking products. In some instances, butadiene will be formed as a by-product of the oxidative dehydrogenation of isopentane to isoprene.

The catalyst can operate for long periods without regeneration. However, if and when regeneration is required, this can be accomplished by simply halting the flow of feed hydrocarbons. Contact of the catalyst with the air and steam can be maintained at the elevated temperature until sufficient activity is restored.

The invention can be illustrated by the following examples.

EXAMPLE I

Preparation of Catalysts

An invention Co/Fe/P/O catalyst was prepared by mixing together 12.5 ml. of a 1 M solution of $Fe(NO_3)_3$, 187.5 ml. of a 1 M solution of $Co(NO_3)_2$, and 3.5 ml. of $H_3PO_4$ (85 percent). The mixture was boiled with stirring until it had the consistency of a sticky syrup. It was then transferred to a dish and calcined by heating to 1200° F. for 2 hours, then heating at 1200° F. for 4 hours. The porous mass was then cooled and crushed to a 20–28 mesh size. The Fe:Co atomic ratio of the catalyst was about 0.07:1 and the P:Co atomic ratio was about 0.27:1. It was designated as invention Catalyst B.

In a manner essentially identical with that described above, 25 ml. of a 1 M solution of $Fe(NO_3)_3$, 175 ml. of a 1 M solution of $Co(NO_3)_2$, and 3.5 ml. of $H_3PO_4$ (85 percent), were converted into an invention catalyst having a Fe:Co atomic ratio of about 0.14:1, and a P:Co atomic ratio of about 0.28:1. It was designated as invention Catalyst C.

In an essentially identical manner, a number of other catalysts were prepared for comparison purposes. These had varying Fe:Co and P:Co ratios and were designated as Catalysts C through O. In one instance, no iron was incorporated into the catalyst at all. This was designated as Catalyst A.

EXAMPLE II

Oxidative Dehydrogenation (OXD) of Isopentane

Each of the catalysts prepared in Example I was used to catalyze the oxidative dehydrogenation of isopentane to isopentenes and isoprene. The runs were carried out in a fixed bed reactor at atmospheric pressure, at an isopentane GHSV of 1000, at an air GHSV of 5,000, and at a steam GHSV of 10,000. The reactor effluent was sampled after 15 minutes on-stream and analyzed. The results of the analysis are shown in Table I and Table II below.

TABLE I

OXD of isopentane

| Run number | 1 | 2 | 3 | 4 | 5 | 6 | 7 |
|---|---|---|---|---|---|---|---|
| Fe:Co ratio | 0 | 0.07 | 0.14 | 0.33 | 0.5 | 0.7 | 1.0 |
| P:Co ratio | 0.33 | 0.27 | 0.28 | 0.33 | 0.30 | 0.4 | 0.5 |
| Catalyst | A | B | C | D | E | F | G |
| Conversion, percent | 25.9 | 26.1 | 23.1 | 23.2 | 22.7 | 10.0 | 12.6 |
| Yield, percent, to— | | | | | | | |
| i-$C_5^=$ plus i-$C_5^{==}$ | 7.9 | 11.0 | 9.7 | 6.2 | 3.1 | 0 | 0 |
| i-$C_5^{==}$ | 6.1 | 5.8 | 4.5 | 4.6 | 3.1 | 0 | 0 |
| Oxidized | 14.0 | 12.8 | 11.4 | 14.0 | 15.1 | 9.7 | 11.3 |
| Cracked | 4.0 | 2.2 | 2.0 | 3.0 | 4.6 | 0.3 | 0.3 |
| Modivity to mono plus diene, percent [1] | 30.7 | 42.3 | 41.8 | 26.8 | 13.6 | 0 | 0 |

[1] Modivity is a simplified selectivity based on gas phase products only.

TABLE II

OXD of isopentane

| Run number | 8 | 9 | 10 | 11 | 12 | 13 | 14 | 15 |
|---|---|---|---|---|---|---|---|---|
| Fe:Co ratio | 0.06 | 0.15 | 0.33 | 0.5 | 1.0 | 3.0 | 3.0 | 7.0 |
| P:Co ratio | 0.55 | 0.6 | 0.7 | 0.8 | 1.0 | 1.0 | 2.0 | 2.0 |
| Catalyst | H | I | J | K | L | M | N | O |
| Conversion, percent | 24. | 13.4 | 18.2 | 17.9 | 15.5 | 16.3 | 14.8 | 15.8 |
| Yield, percent, to— | | | | | | | | |
| i-$C_5^=$ plus $C_5^{==}$ | 6.7 | 6.2 | 2.2 | 0 | 0 | 0 | 0 | 0 |
| i-$C_5^{==}$ | 4.6 | 4.0 | 2.2 | 0 | 0 | 0 | 0 | 0 |
| Oxidized | 14.4 | 10.2 | 14.5 | 15.2 | 14.3 | 14.6 | 14.5 | 15.2 |
| Cracked | 3.1 | 2.0 | 1.5 | 2.7 | 1.2 | 1.7 | 0.3 | 0.6 |
| Modivity to mono plus diene, percent [1] | 27.6 | 33.6 | 12.2 | 0 | 0 | 0 | 0 | 0 |

[1] Modivity is a simplified selectivity based on gas phase products only.

In Table I, it is readily seen that, in a Co/Fe/P/O catalyst, the Fe:Co ratio is critical. A relatively small amount of Fe (Invention Runs 2 and 3) results in a greater selectivity to monoolefins and diolefins than relatively large amounts of Fe (Control Runs 4, 5, 6 and 7) or no Fe at all (Control Run 1).

In Table II, it is also evident that the phosphorus level of a Co/Fe/P/O catalyst is also critical. Neither small nor large amounts of Fe are better than the Fe-free catalyst of Control Run 1 if the level of P is too high, that is, if the P:Co atomic ratio is greater than about 0.5:1. Runs 8-15 are control runs.

A cobalt catalyst containing neither iron nor phosphorus, that is, cobalt oxide catalyst, is very active for oxidation of hydrocarbons to carbon oxides and has essentially no selectivity for the production of mono- or diolefins.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A process for the oxidative dehydrogenation of a dehydrogenatable hydrocarbon feedstock having from 2 to 12 carbon atoms which comprises contacting said feedstock in the vapor phase under dehydrogenation conditions with a catalyst consisting essentially of cobalt, iron, phosphorous and combined oxygen, wherein the phosphorous:cobalt atomic ratio is in the range of 0.01-0.5:1, the iron:cobalt atomic ratio is in the range of 0.01-3:1, and the oxygen is present in an amount sufficient to satisfy the valence requirements of said cobalt, iron and phosphorous.

2. The process of claim 1 wherein said phosphorous: cobalt atomic ratio is in the range of 0.1-0.3:1 and said iron:cobalt atomic ratio is in the range of 0.05-0.2:1.

3. The process of claim 2 wherein said feedstock is isopentane.

4. The process of claim 3 wherein said phosphorous: cobalt atomic ratio is 0.27:1 and said iron:cobalt atomic ratio is 0.07:1.

5. The process of claim 3 wherein said phosphorous: cobalt atomic ratio is 0.28:1 and said iron:cobalt atomic ratio is 0.14:1.

References Cited
UNITED STATES PATENTS

| | | | |
|---|---|---|---|
| 3,270,080 | 8/1966 | Christmann | 260—680 E |
| 3,414,631 | 12/1968 | Grasselli et al. | 260—680 E |
| 3,642,930 | 2/1972 | Grasselli et al. | 260—680 E |
| 3,702,875 | 11/1972 | Manning et al. | 260—680 E |
| 3,764,632 | 10/1973 | Takenaka et al. | 260—680 E |

PAUL M. COUGHLAN, Jr., Primary Examiner

U.S. Cl. X.R.

260—683.3